US009127937B2

(12) United States Patent
Nobis et al.

(10) Patent No.: US 9,127,937 B2
(45) Date of Patent: *Sep. 8, 2015

(54) METHOD FOR MEASURING A CHASSIS AND DEVICE FOR MEASURING THE CHASSIS GEOMETRY OF A MOTOR VEHICLE

(75) Inventors: Guenter Nobis, Nuertingen (DE); Steffen Abraham, Hildesheim (DE); Volker Uffenkamp, Ludwigsburg (DE)

(73) Assignee: ROBERT BOSCH GMBH, Stuttgart (DE)

( * ) Notice: Subject to any disclaimer, the term of this patent is extended or adjusted under 35 U.S.C. 154(b) by 544 days.

This patent is subject to a terminal disclaimer.

(21) Appl. No.: 13/142,392

(22) PCT Filed: Oct. 29, 2009

(86) PCT No.: PCT/EP2009/064254
§ 371 (c)(1),
(2), (4) Date: Sep. 27, 2011

(87) PCT Pub. No.: WO2010/076054
PCT Pub. Date: Jul. 8, 2010

(65) Prior Publication Data
US 2012/0007958 A1    Jan. 12, 2012

(30) Foreign Application Priority Data

Dec. 29, 2008   (DE) ......................... 10 2008 055 163

(51) Int. Cl.
*G01B 11/00* (2006.01)
*G01B 11/275* (2006.01)
(52) U.S. Cl.
CPC ...... *G01B 11/2755* (2013.01); *G01B 2210/143* (2013.01)

(58) Field of Classification Search
CPC .......... H04N 13/0242; H04N 13/0239; H04N 13/0048
USPC ............................................................ 348/48
See application file for complete search history.

(56) References Cited

U.S. PATENT DOCUMENTS

| 4,854,702 | A | 8/1989 | Stieff | |
|---|---|---|---|---|
| 6,134,792 | A | 10/2000 | January | |
| 6,397,164 | B1 * | 5/2002 | Nobis et al. | ............... 702/150 |

(Continued)

FOREIGN PATENT DOCUMENTS

| DE | 197 57 760 | | 7/1999 | |
|---|---|---|---|---|
| EP | 895056 | A2 * | 2/1999 | ........... G01B 11/275 |

(Continued)

OTHER PUBLICATIONS

International Search Report for PCT/EP2009/064254, dated Apr. 8, 2010.

*Primary Examiner* — Jay Patel
*Assistant Examiner* — Frank Huang
(74) *Attorney, Agent, or Firm* — Kenyon & Kenyon LLP

(57) ABSTRACT

A method and device are described for measuring a chassis and for measuring the chassis geometry of a vehicle, which includes providing a chassis measurement system having four measurement heads situated in known positions relative to one another, of which each has a monocular image recording device, the position of the measurement heads relative to one another being known, and the distance of the front measurement heads from one another differing from the distance of the rear measurement heads from one another.

9 Claims, 2 Drawing Sheets

(56) References Cited

U.S. PATENT DOCUMENTS

2004/0039544 A1 2/2004 Merrill et al.
2006/0152711 A1* 7/2006 Dale et al. ............... 356/139.09

FOREIGN PATENT DOCUMENTS

| | | |
|---|---|---|
| EP | 1 042 643 | 10/2000 |
| WO | 2008/028832 | 3/2008 |

* cited by examiner

METHOD FOR MEASURING A CHASSIS AND DEVICE FOR MEASURING THE CHASSIS GEOMETRY OF A MOTOR VEHICLE

FIELD OF THE INVENTION

The present invention relates to a method for measuring a chassis and to a device for measuring the chassis geometry of a vehicle.

BACKGROUND INFORMATION

German patent documents DE 107 57 763 and EP 1 042 643 B1 discuss a device for determining the wheel and/or axle geometry of motor vehicles using an optical measuring device having at least two image recording devices. This is a so-called stereo measurement system having binocular (stereo) image recording devices. Such binocular image recording devices are elaborate and expensive.

In other axle measuring systems, such as, for example, U.S. Pat. No. 6,134,792, measurement targets having control point fields are used, which have to be manufactured with a high degree of precision and are therefore also expensive. In addition, such high-precision measurement targets can easily be damaged or deformed during everyday operations in the workshop, resulting in uncontrollable measurement errors.

DISCLOSURE OF THE INVENTION

An object of the exemplary embodiments and/or exemplary methods of the present invention is therefore to provide an axle measuring method that is reliable and economical and that supplies precise measurement values, and to provide an associated axle measuring device.

This object is achieved by the subject matter recited in the independent patent claims. Advantageous developments result from the dependent patent claims.

In a method according to the present invention for measuring a chassis, first a chassis measurement system is provided having four measurement heads situated in known positions relative to one another, each head having a monocular image recording device. The position of the measurement heads relative to one another is known, and the distance of the front measurement heads from one another is different from the distance of the rear measurement heads from one another. The front and rear measurement heads are situated at the measurement station in such a way that they are each able to record an image of an oppositely situated wheel of a motor vehicle standing in the measurement station.

First, a respective front wheel or measurement target attached thereto is recorded by the rear measurement heads in at least one run-in position of the vehicle. Subsequently, the motor vehicle is moved into a first, and then into at least one second, main measuring position, and the four wheels, or the measurement targets attached thereto, are recorded using each of the four measurement heads.

By carrying out local 3D reconstructions using a local scale, the translation vectors, the rotation vectors, the wheel rotational angles between the run-in positions and the main measurement positions, and the rotational centers and axes of the wheels can be determined on the basis of the recorded images of the wheels or of the measurement targets attached thereto. A local 3D reconstruction of the run-in measurement and of the main measurement takes place.

From the measurements of the front wheels or of the measurement targets attached thereto in the run-in positions and in the main measurement positions, a global scale for the measurement heads can be determined, for example from the compensation of the driving movement or displacement paths. The four local scales of the main measurement are calibrated to a common, local scale via a compensation of the driving movement or of the displacement paths.

The global scale of the main measurement is transferred to the 3D reconstruction of the run-in measurement via the premise of "identical geometry," because the common driving movement does not include the run-in measurement. The absolute scale is introduced for example via the difference formula stated below.

Finally, the chassis measurement parameters of the vehicle, in particular the camber, the partial toe, and/or the total toe, can be determined therefrom.

A device according to the present invention for measuring the chassis geometry of a vehicle includes a system of four measurement heads situated in known positions relative to one another, each having a monocular image recording device of the type described above. The device according to the present invention further includes an evaluation device that is set up to determine during operation, from the recordings of the wheels or of the measurement targets attached thereto in a first and at least one second main measuring position of the vehicle, using each of the four measurement heads, the translation vectors, the rotation vectors, and the wheel angles of rotation between these positions, as well as the rotational axes of the wheels, by carrying out local 3D reconstructions, and to determine, from the measurements of the front wheels or the measurement targets attached thereto in the run-in and main measurement positions, a global scale for the measurement heads, and therefrom to determine the chassis measurement parameters of the vehicle, in particular the camber and the partial and/or total toe.

According to the exemplary embodiments and/or exemplary methods of the present invention, details of the geometry of the wheels or the targets are acquired using monocular image recording devices; the acquisition of the front wheels or of the targets attached thereto takes place in at least one run-in position and in at least two main measurement positions, and the acquisition of the rear wheels or of the targets attached thereto takes place simultaneously in the at least two main measurement positions.

All methods and devices according to the present invention result in cost advantages, because a high-precision manufacturing of optical targets is not necessary, because a second image recording device for each measurement head can be omitted, and because a distance measurement sensor is not required.

The methods and devices according to the present invention can be realized both with measurement targets and without measurement targets.

If measurement targets are not used, but rather the wheels themselves, natural details of the geometry of the wheels, such as an edge of a rim, a valve, a design element, or lettering on the tire wall, may be used.

If measurement targets are used, these targets do not require a control point field; as a result, the measurement targets are significantly easier to produce, and uncontrollable measurement errors resulting from deformation or damage of precision targets having control point fields in everyday workshop operations can be reliably avoided.

In addition, the methods according to the present invention are easy to execute, and the associated devices are easy to operate. If targets are used, a precise positioning of the wheel adapters of such targets relative to the axis of rotation is not necessary.

The evaluation of the monocular image sequences of at least two images of the relevant wheel, or of the measurement target attached thereto, in order to determine geometrical quantities takes place using known image processing methods according to the principle "structure from motion," and the application thereof for three-dimensional chassis measurement.

The 2D image coordinates of the imaged geometry details, measured in all recorded images, yield the 3D coordinates thereof in a local wheel coordinate system, as well as the translation and rotation vectors of the vehicle and the angles of rotation of the wheel between the positions, and the information required for the axle measurement in the form of the 3D position of the rotational center and the spatial orientation of the axis of rotation. This calculation step is referred to in the following as 3D reconstruction. This is known to those skilled in the art and does not require further explanation here.

After 3D reconstruction has taken place, the positions of the geometry details in the wheel coordinate system form a control point system, so that subsequent measurements can be carried out while the vehicle is stationary, for example in order to set toe and camber when a defective position of the wheel has been recognized. The 3D reconstruction determines merely the shape of the wheel coordinate system, not its scale. Each monocular image recording device calculates its associated wheel coordinate system using a local scale specified arbitrarily during the reconstruction.

For those measurement values of the axle measurement that are based essentially on the calculation of angles, the scales of all the image recording devices do not need to be identical, nor do they need to be known absolutely. The local scales must be matched to one another only if additional metric measurement values have to be determined, or the partial toe of the rear wheels has to be determined. In the following, a scale that is common to all the image recording devices is referred to as a global scale. The global scale is adapted to an absolute scale through the introduction of an additional, dimensionally accurate external item of information.

In the following, the local scale is understood as an arbitrarily introduced scale of a 3D reconstruction of a wheel, and the global scale is understood as a common scale for all four reconstructions through compensation of the vehicle movement, and the absolute scale is understood as the introduction of a dimensionally accurate external item of information for the correction of the global scale. In the present invention, the absolute scale results from the two distances dHA and dVA, for example via the formula named below.

According to a first specific embodiment of the present invention, the absolute scale is determined from the ratio of the difference, obtained from the local 3D reconstructions, of the calculated track width of the front axle measured in the run-in position and the calculated track width of the front axle measured in the main measuring position to the known spacing of the measurement heads. The track width refers to the distance between the right and the left wheel of an axle, measured from tire center to tire center. In particular, a correction factor for the conversion of the global scale to the absolute scale can be determined according to the following formula:

$$s = \frac{wHA_{3D} - wVA_{3D}}{dVA - dHA}$$

Here, dVA and dHA represent the distance in the transverse direction of the vehicle between the front image recording devices and the rear image recording devices, stored in the evaluation device as target values. The quantities $wVA_{3D}$ and $wHA_{3D}$ represent the track widths of the front axle of the vehicle determined using the global scale, measured using the front image recording devices and the rear image recording devices in the transverse direction of the vehicle.

According to a further specific embodiment of the present invention, the recordings made by the measurement heads in the run-in and main measurement positions take place during forward movement of the vehicle without stopping. This enables the chassis measurement method according to the present invention to be carried out rapidly and easily for the user.

According to a further specific embodiment of the present invention, image sequences of a plurality of images are recorded during the recordings in the run-in and main measurement positions. In this way, the precision of the obtained chassis measurement parameters of the vehicle can be further increased.

According to further specific embodiments of the present invention, the recordings of the wheels or the measurement targets attached thereto by the measurement heads take place synchronously, or with the same measurement frequency, or the time intervals between the image recordings are precisely known.

A compensation of a movement path can also take place. Here, measurement data using non-synchronized cameras are supplied to a common 3D reconstruction if at least one translation vector is known. If the vehicle does not move continuously, but rather stops in at least two positions, for example at the beginning and at the end of the image sequence, and if all cameras acquire at least one image of the stationary wheels, the translation vectors in the respective local 3D coordinate system of the image recording devices can be sealed in such a way that at least one translation vector has the same length in all four image recording devices.

It is also possible to compensate the movement profile. Here, the measurement data of non-synchronized cameras are supplied to a common 3D reconstruction if the movement of the vehicle takes place with a speed that is not constant. If the vehicle accelerates or decelerates, a movement profile can be produced from the measurement data of each image recording device. The scaling for a common 3D reconstruction results from the adaptation of the movement profiles.

Here, the scale can be introduced for only one image recording device and communicated to the other cameras. The vehicle moves as a rigid body and is observed by all the image recording devices. The information about the movement of the vehicle is used to reduce the four unknown scale factors in the local 3D reconstructions of the four measurement heads to a single, common scale factor. The scales in all four measurement heads are then identical. Via the introduction of the global scale to one image recording device, the measurement values of all the cameras can be defined in the global scale.

Given a temporally synchronous image recording in all four image recording devices, a common 3D reconstruction is immediately possible. The translation vectors are scaled in the respective local 3D coordinate system of the image recording device in such a way that all four image recording devices have the same length.

In the following, the exemplary embodiments and/or exemplary methods of the present invention are described in detail on the basis of exemplary embodiments with reference to the accompanying Figures.

DETAILED DESCRIPTION

Figure 1:
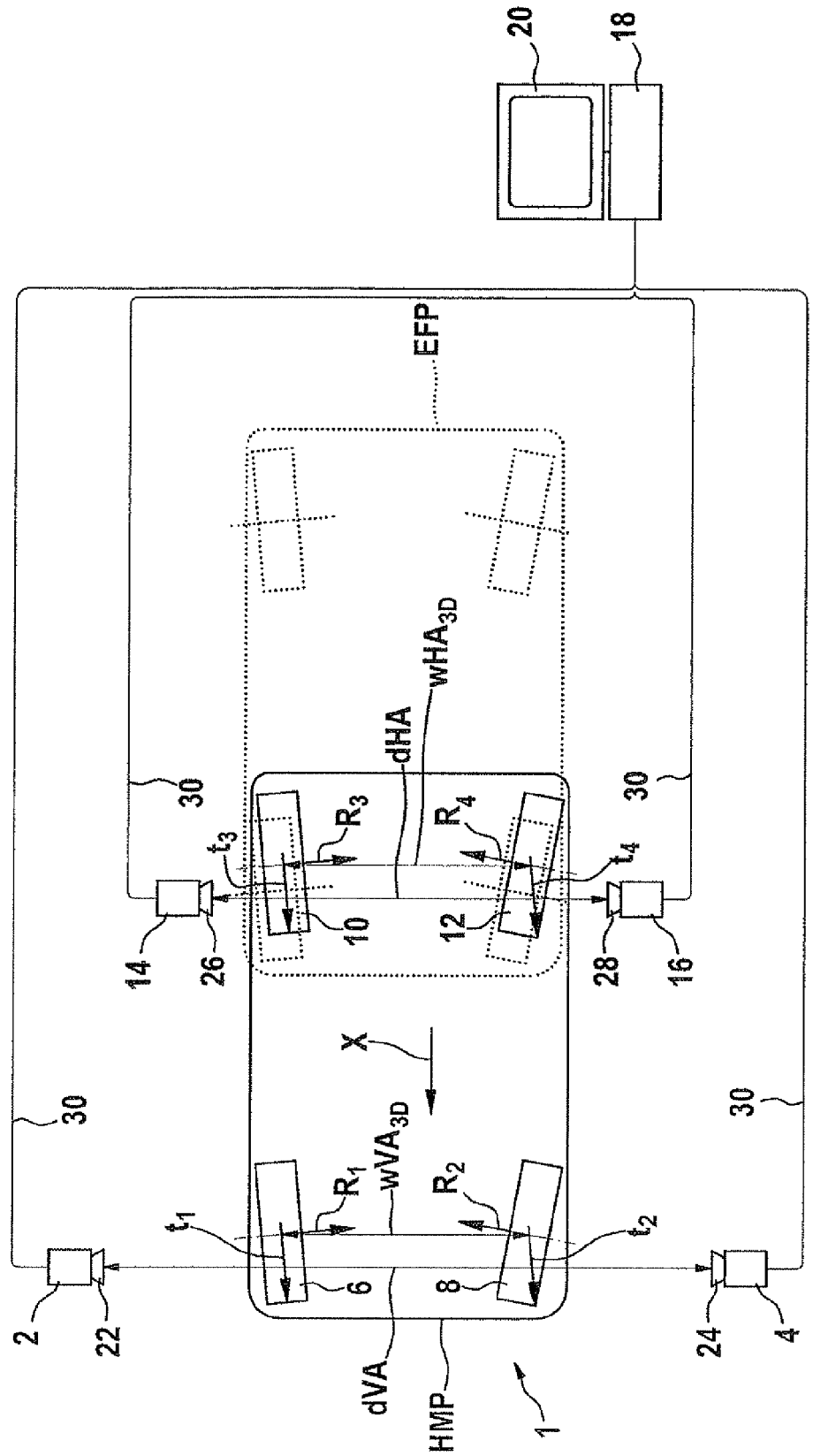
FIG. 1 shows a schematic representation of a device according to the present invention for measuring the chassis geometry of a vehicle, as well as a representation of a vehicle in a run-in position EFP and a main measurement position HMP, in a top view.

FIG. 1 shows a schematic representation of a device according to the present invention for measuring the chassis geometry of a vehicle 1, as well as a representation of a vehicle 1 in a run-in position and in a main measurement position, in a top view.

The device has four measurement heads 2, 4, 14, 16, situated in opposed pairs on both sides of a vehicle 1. Measurement heads 2, 4, 14, 16 each have, on their side facing vehicle 1, a monocular image recording device 22, 24, 26, 28, realized for example as a camera. The position of measurement heads 2, 4, 14, 16 in the coordinate system of the measurement station is known and is not changed during the measurement.

Front measurement heads 2 and 4 are situated at a distance dVA from one another in the transverse direction of the vehicle, and rear measurement heads 14 and 16 are situated at a distance dHA from one another in the transverse direction of the vehicle. Distance dVA of front measurement heads 2 and 4 is significantly larger than is distance dHA of rear measurement heads 14 and 16. In order to enable the determination of the global scale according to the present invention, the distance of front measurement heads 2 and 4 from one another must be different from the distance of rear measurement heads 14 and 16 from one another; differing from the present exemplary embodiment, it is of course also possible for the distance of rear measurement heads 14 and 16 from one another to be larger than the distance of front measurement heads 2 and 4 from one another.

Measurement heads 2, 4, 14, 16 are connected via data lines 30 to an evaluation unit 18 for evaluating the data recorded and determined by measurement heads 2, 4, 14, 16. Evaluation device 18 is connected to a display unit 20 in order to display the results of the measurement. In addition, evaluation device 18 is provided with an input device not shown in FIG. 1, e.g. a keyboard for controlling evaluation device 18.

In FIG. 1, vehicle 1 is shown with its four wheels 6, 8, 10, 12 in a run-in position EFP, indicated by dashed lines, and in a main measurement position HMP indicated by solid lines. In run-in position EFP, front wheels 6 and 8 are situated in the field of view of image recording devices 26 and 28 of rear measurement cameras 14 and 16. In main measurement position HMP, front wheels 6 and 8 are situated in the field of view of image recording devices 22 and 24 of front measurement heads 2 and 4, and rear wheels 10 and 12 are situated in the field of view of image recording devices 26 and 28 of rear measurement heads 14 and 16.

In order to carry out the measurement, vehicle 1 is moved into the measurement station. During this movement, right rear image recording device 26 acquires an image sequence 1 of front wheel 6, and image recording device 16 acquires an image sequence 2 of left front wheel 8. FIG. 1 shows an example of a run-in position EFP during the acquisition of these image sequences 1 and 2.

Subsequently, front wheels 6 and 8 are moved through the field of view of front image recording devices 22 and 24, and front right image recording device 22 acquires an image sequence 3 of right front wheel 6, while left front image recording device 24 acquires an image sequence 4 of left front wheel 8. In addition, rear right image recording device 26 acquires an image sequence 5 of right rear wheel 10, and left rear image recording device 28 acquires an image sequence 6 of left rear wheel 12. FIG. 1 shows an example of a main measurement position HMP during the acquisition of these image sequences 3, 4, 5, and 6.

In the present exemplary embodiment, the acquisition of image sequences 1 and 2 and the acquisition of image sequences 3 through 6 each take place synchronously. Alternatively, it is also possible to acquire image sequences such as those described above with the same measurement frequency, with precisely known time intervals between the image recordings, through a compensation of a movement path or through a compensation of the movement profile.

There now takes place a 3D reconstruction and determination of movement from the six image sequences that are now present. Matching of the 3D reconstruction of the geometry details from image sequences 3 through 6 to one another in terms of scale is carried out via the vehicle movement, as described above.

If vehicle 1 is regarded as a rigid body, the 3D coordinates of the geometry details from the evaluation of image sequences 1 and 2 in a local coordinate system of vehicle 1 or of front wheels 6 and 8 must be identical in terms of scale to the 3D coordinates from the evaluation of image sequences 3 and 4. Thus, the scale can also be transferred to image sequences 1 and 2. Alternatively, this also holds for the track width as the distance from the rotational centers to the front axle.

From the measurements of the front axle with image sequences 1 and 2, as well as 3 and 4, the missing absolute scale can now be determined. For this purpose, using the global scale, track width $wVA_{3D}$ of the front axle is determined, with measurement in the run-in position $wHA_{3D}$ and measurement in the main measurement position $wVA_{3D}$. If the absolute scale is correct, the two track widths must be equally large. The correction factor s between the global scale and the absolute scale results from the ratio of the track width difference to the actually known difference in the distances between the image recording devices as stored in the evaluation device, for example on the basis of the following formula:

$$s = \frac{wHA_{3D} - wVA_{3D}}{dVA - dHA}$$

Thus, using the global scale the track width of the front axle is calculated, with measurement using the front measurement system. The error of the track width calculation corresponds to the error of the absolute scale.

Using the 3D reconstruction of the points on the wheel and of the global scale, the track width of the front axle is thus calculated from the measurements of the vehicle in the run-in position, i.e. from the measurements of the rear measurement system. If the global scale were correct, i.e. identical to the absolute scale, then the two calculated track widths would be equal, i.e. $wVA_{3D}=wHA_{3D}$. If not, a correction s for the scale factor can be calculated from the difference.

The geometry details can be natural details of the geometry of wheel 6, 8, 10, 12, such as the edge of a rim, a valve, a design element or lettering, or a measurement target attached to wheel 6, 8, 10, 12. Through the use of natural geometry details, the step of attaching and later removing measurement targets can be omitted, so that the measurement can be carried out faster. On the other hand, measurement targets have high contrast and can therefore be recognized particularly well by image recording devices 22, 24, 26, 28. Thus, measurement targets enable a precise chassis measurement, in particular even in poor lighting conditions.

Because image recording devices 22, 24, 26, 28 are monocular image recording devices 22, 24, 26, 28, the position of the geometry details in the three-dimensional coordinate system of the respective measurement head 2, 4, 14, 16 can be determined only in a manner that does not include an unknown scale factor between the local scale and the absolute scale, or between the global scale and the absolute scale, if the local scales have been matched to one another.

Figure 2:
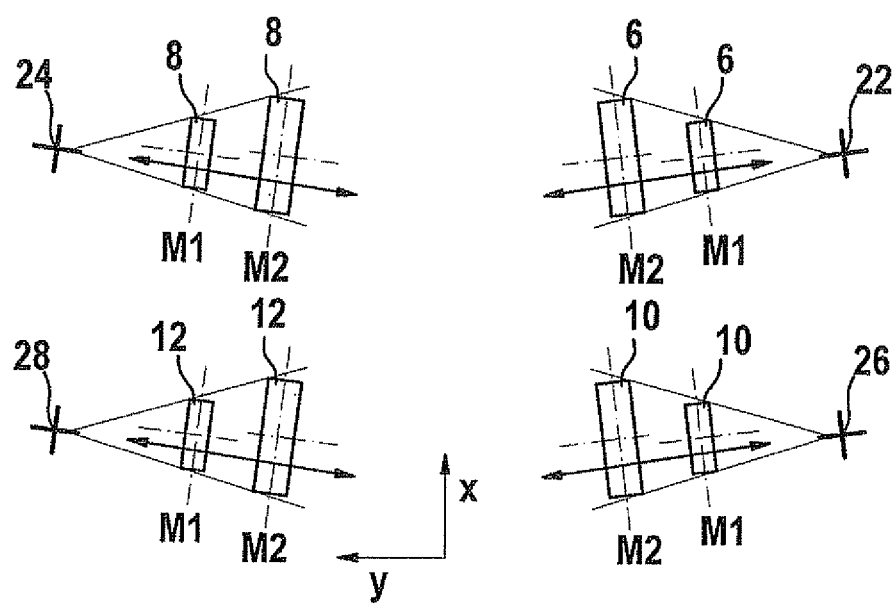
FIG. 2 schematically shows the 3D reconstruction of an axle geometry without a global scale.

FIG. 2 schematically shows the 3D reconstruction of an axle geometry without a global scale, and provides an exemplary illustration of this scale uncertainty.

FIG. 2 shows a 3D reconstruction of wheels 6, 8, 10, 12 for two sample scales M1 and M2. From FIG. 2, it is clear that a change in the scale results in a scaling of all path lengths by the same factor. The imaging of a large, remote object, here wheels 6, 8, 10, 12, using scale M2 is identical to scale-reduced wheels 6, 8, 10, 12 using scale M1, which are situated at a shorter distance from the respective image recording device 22, 24, 26, 28.

From the difference of the geometry details in the images from two main measurement positions HMP of vehicle 1, and the formulation of a three-dimensional movement of a rigid body between the two positions with introduction of the rotational centers, the axes of rotation, and the angles of rotation of the wheels, it is now possible to determine translation vectors t1, t2, t3, t4 and rotation vectors R1, R2, R3, R4 of wheels 6, 8, 10, 12. This can take place either using a logic unit in the respective measurement head 2, 4, 14, 16 or in evaluation device 18.

Because vehicle 1 is to be regarded as a rigid body for this measurement, the position of wheels 6, 8, 10, 12 relative to one another does not change when vehicle 1 moves. Translation vectors t1, t2, t3, and t4 of wheels 6, 8, 10, 12 must therefore have the same length in the global coordinate system. Therefore, the four local scales of measurement heads 2, 4, 14, 16 can be reduced to a common, global scale by scaling translation vectors t1, t2, t3, t4 in such a way that they have the same length.

In order to scale translation vectors t1, t2, t3, t4 and to adapt them to a common scale, the acquisition of all four wheels 6, 8, 10, 12 by image recording devices 22, 24, 26, 28 of measurement heads 2, 4, 14, 16 must be temporally synchronized so that each of the four wheels 6, 8, 10, 12 is acquired in the same position of vehicle 1.

In the simplest variant, vehicle 1 is stopped, as described above, in at least two positions, e.g. in two main measurement positions, and the positions of the geometry details are determined in these two positions of vehicle 1. An additional temporal synchronization of the image recording times is then not required. Vehicle 1 can also be stopped in additional positions in order to determine the positions of the geometry details in these positions and to increase the precision of the measurement.

From the measured data, known methods can be used to determine the axis of rotation and the rotational center of wheels 6, 8, 10, 12 in the coordinate system of the respective measurement head 2, 4, 14, 16.

This evaluation can take place wheel-by-wheel, i.e. separately for each of the four wheels 6, 8, 10, 12, or axle-by-axle, i.e. a common evaluation can be made for opposed wheels 6, 8, 10, 12 of an axle, or the evaluation can be made in common for all wheels 6, 8, 10, 12. For the axle-by-axle evaluation and for the common evaluation of all wheels 6, 8, 10, 12, the recordings must be temporally synchronized.

In addition to the geometry details of wheels 6, 8, 10, 12, geometry details on the body of vehicle 1 can also be acquired in order to acquire steering and spring movements of vehicle 1 and to compensate them mathematically.

As described, the 3D coordinates of each measurement head are determinable only in a manner that excludes a scale factor; i.e., the shape of the reconstructed 3D point cloud is known, but its size is not known (see FIG. 2). A common scale is obtained from the compensation of translation vectors t1, t2, t3, t4, which describe the movement of the geometry details in space.

However, from FIG. 2 it can be seen that the scaling to a common scale does not cause any change in the angles between the paths. Therefore, these angles, such as for example the camber of wheels 6, 8, 10, 12, the partial toe of the front axle, and the total toe of the front and rear axle, are independent of the global scale, and are thus determinable without knowledge of the common scale.

In contrast, measurement quantities that require path lengths are a function of the common, absolute scale. This relates for example to the calculation of the wheel base and of the track width, or of the vehicle longitudinal midaxis M, which is required for the calculation of the partial toe of the rear axle.

What is claimed is:

1. A method for chassis measurement, the method comprising:

providing a chassis measurement system having four measurement heads situated in known positions relative to one another, each of which has a monocular image recording device, the position of the measurement heads relative to one another being known, and a distance of front measurement heads from one another differing from a distance of rear measurement heads from one another;

recording one of a respective front wheel and a measurement target attached thereto, in at least one run-in position of the vehicle, using the rear measurement heads;

recording each of (i) the four wheels and (ii) the measurement targets attached thereto, using each of the four measurement heads, in a first main measurement position and in at least one second main measurement position of the vehicle, wherein each of (i) the four wheels or (ii) the measurement targets attached thereto is recorded by the same respective measurement head in the first main measurement position and in the at least one second main measurement position, and wherein each of (i) the four wheels and (ii) the measurement targets attached thereto moves relative to its respective measurement head between the first main measurement position and the at least one second main measurement position of the vehicle;

executing local 3D reconstructions using a local scale to determine translation vectors, rotation vectors, and wheel angles of rotation between these positions, as well as centers of rotation and axes of rotation of the wheels, from one of (i) recorded images of the wheels and (ii) the measurement targets attached thereto;

adapting the four local scales of the main measurement positions to a common, global scale through compensation of the vehicle movement;

transferring the global scale to the 3D reconstruction of the run-in measurement positions via compensation of the identical geometry of the front axle;

determining an absolute scale for the measurement heads from one of (i) the measurements of the front wheels and (ii) the measurement targets attached thereto in the run-in positions and in the main measurement positions; and determining the chassis measurement parameters of the vehicle, including at least one of a camber, a partial toe, and a total toe;

wherein at least one of (a) and (b) is satisfied, wherein (a) includes image sequences made up of one of (i) a plurality of images of the front wheels and (ii) the measurement targets attached thereto, which are recorded during each of the recordings made by the rear measurement heads in the run-in positions of the vehicle, and wherein (b) includes image sequences made up of one of (i) a plurality of images of the wheels and (ii) the measurement targets attached thereto being recorded during each of the recordings made by the measurement heads in the main measurement positions of the vehicle.

2. The method of claim 1, wherein an absolute scale is determined from the ratio of track widths, calculated from the local 3D reconstructions, to the known distance of the measurement heads.

3. The method of claim 1, wherein the recordings of the measurement heads in the run-in positions and in the main measurement positions occur during movement of the vehicle.

4. The method of claim 1, wherein one of (i) the recordings of the wheels and (ii) the measurement targets attached thereto, by the measurement heads occur synchronously.

5. The method of claim 1, wherein the measurement heads carry out the recordings with the same measurement frequency, or wherein the time intervals between two image recordings is known.

6. A device for measuring a chassis geometry of a vehicle, comprising:

a system of four measurement heads situated in known positions relative to one another, of which each has a monocular image recording device, the heads being set up so as to acquire during operation an image of a respective wheel, or of a measurement target attached thereto, of the vehicle, the position of the measurement heads relative to one another being known, and a distance of the front measurement heads from one another differing from the distance of the rear measurement heads from one another;

wherein the system is set up to satisfy at least one of (a) and (b), wherein (a) includes image sequences made up of one of (i) a plurality of images of the front wheels and (ii) the measurement targets attached thereto, which are recorded during each of the recordings made by the rear measurement heads in the run-in positions of the vehicle, and wherein (b) includes image sequences made up of one of (i) a plurality of images of the wheels and (ii) the measurement targets attached thereto being recorded during each of the recordings made by the measurement heads in the main measurement positions of the vehicle; and an evaluation device, which is set up to:

(i) determine, during operation, the translation vectors and the rotation vectors of the wheels, the wheel rotational angles between the run-in positions, and the centers of rotation and axes of rotation of the wheels, the determination being made from the recordings of the wheels, or of the measurement targets attached thereto, in a first run-in position and in a second run-in position of the vehicle, using each of the two measurement heads, (ii) determine the translation vectors and the rotation vectors of the wheels, the wheel angles of rotation between the main measurement positions, and the rotational centers and axes of rotation of the wheels, the determination being made from the recordings of the wheels, or of the measurement targets attached thereto, in a first main measurement position and in a second main measurement position of the vehicle, using each of the four measurement heads, wherein each of the four measurement heads records the same wheel, or measurement target attached thereto, in the first main measurement position and in the second main measurement position of the vehicle, and wherein each wheel, or measurement target attached thereto, moves relative to its respective measurement head between the first main measurement position and the second main measurement position of the vehicle, (iii) determine, from the measurements of the front wheels or the measurement targets attached thereto in the run-in positions and in the main measurement positions, an absolute scale for the measurement heads, and (iv) determine the chassis measurement parameters of the vehicle, including at least one of a camber, a partial toe, and a total toe.

7. The device of claim 6, further comprising:

setting up the evaluation device to determine, during operation, the absolute scale from the ratio of the track widths, calculated from the local 3D reconstructions, to the known distance of the measurement heads.

8. The device of claim 6, the distance of the front measurement heads from one another being greater than the distance of the rear measurement heads from one another.

9. The device of claim 6, the distance of the front measurement heads from one another being smaller than the distance of the rear measurement heads from one another.

* * * * *